United States Patent [19]

Rao et al.

[11] Patent Number: 4,522,653

[45] Date of Patent: Jun. 11, 1985

[54] SALT CEMENT DISPERSANT AND METHOD OF USING SAME IN CEMENTING SUBTERRANEAN WELLBORE

[75] Inventors: S. Prabhakara Rao, Duncan; Lance E. Brothers, Lawton; Bobby G. Brake, Duncan, all of Okla.

[73] Assignee: Halliburton Company, Duncan, Okla.

[21] Appl. No.: 596,229

[22] Filed: Apr. 3, 1984

[51] Int. Cl.$^3$ .............................................. C04B 7/02
[52] U.S. Cl. ..................................... 106/90; 106/314; 166/293; 166/294
[58] Field of Search ....................... 106/90, 314; 524/2, 524/3; 166/293, 294

[56] References Cited

U.S. PATENT DOCUMENTS

| | | | |
|---|---|---|---|
| 2,909,508 | 10/1959 | Jones | 526/208 |
| 3,252,904 | 5/1966 | Carpenter | 166/283 |
| 3,617,572 | 11/1971 | Monagle | 210/54 |
| 3,779,917 | 12/1973 | Norton et al. | 252/8.55 D |
| 4,258,790 | 3/1981 | Hale | 166/293 |
| 4,340,525 | 7/1982 | Hubner et al. | 106/90 |

FOREIGN PATENT DOCUMENTS 2546135 10/1975 Fed. Rep. of Germany .

OTHER PUBLICATIONS

T. L. Pugh, Chemical Abstracts: C. A. 55:16080c (1960).
W. Heller, Chemical Abstracts: C. A. 50:10483f (1956).
D. K. Smith, Cementing, SPE—Monography, vol. 4, 1976, p. 25.

*Primary Examiner*—William R. Dixon, Jr.
*Assistant Examiner*—Ann M. Knab
*Attorney, Agent, or Firm*—Robert A. Kent; Thomas R. Weaver

[57] ABSTRACT

A dispersant for cement slurries is provided comprised of a copolymers of sodium vinylsulfonate and either acrylic acid or acrylamide. Salt cement slurries and method of use in cementing in subterranean wellbores are also provided.

28 Claims, No Drawings

SALT CEMENT DISPERSANT AND METHOD OF USING SAME IN CEMENTING SUBTERRANEAN WELLBORE

In the drilling of a wellbore penetrating subterranean formations, it is often desirable or necessary to deliver hydraulic cement compositions to various locations in the wellbore. For example, it is often necessary to seal or cement subterranean zones penetrated by the well. More particularly, it is common practice to cement the annular space in an oilwell between the surrounding formation and casing which extends into the wellbore.

In cementing the annular space of a subterranean wellbore an aqueous hydraulic cement slurry is prepared and pumped down the inside of the casing. The cement slurry then flows back up the outside of the casing and fills the annular space. Any cement slurry remaining in the casing is displaced and segregated using plugs and aqueous displacement fluid. Following delivery of the cement slurry to the annular space between the formation and the casing, the cement sets sealing the subterranean zones in the formation and retaining the casing with respect to the formation.

Salt is occasionally used in cement slurries to bond the cement more firmly to salt sections in the formations and to shales. Salt also causes the cement to expand as it sets and acts as a dispersant. The use of cement slurries containing large percentages of salt also protects shale sections from sluffing during cementing, prevents bridging between formation zones, and prevents lost circulation that can result if a fresh water cement slurry is used with respect to such shale or salt formations. Generally cement slurries containing from 5 to 37.2 (saturated) percent salt by weight of water in the slurry are used in these applications.

When either salt cement slurries or fresh water cement slurries are prepared for cementing subterranean wellbores, it is often desirable to include various additives to tailor the cement slurry to specific well requirements. Such additives include accelerators, retarders, dispersants and fluid loss additives among others. Some of these additives have an effect on the properties of other additives and such effects must be taken into account when preparing the overall slurry.

Dispersing agents are added to cement slurries to improve their flow properties. The dispersed slurries have a lower viscosity and can be pumped in turbulence at lower pressures and velocities. This reduces the horsepower necessary to pump the cement slurry and prevents premature dehydration. A common dispersant is naphthalene sulfonic acid condensed with formaldahyde. The naphthalene sulfonic acid-formaldahyde condensate works well as a dispersant with fresh water cement slurries. However, it increases as opposed to decreases the viscosity of high salt cement slurries. Accordingly, it can not be used as a dispersant in the salt cement slurries which are required for certain formations. Other standard dispersants are also not suitable in salt cement slurries.

Gluconic acid (or its dry form—delta gluconolactone) has been utilized in the past as a dispersant for salt cement slurries. However, gluconic acid may not be used except when the well formation is sufficiently hot to overcome the strong retardancy effect of the gluconic acid. If the temperature of the formation is not sufficiently high, generally greater than 200° F., then the cement will not set properly. Prior to the present invention, a completely satisfactory dispersant useful over broad temperature ranges has not been found for salt cement slurries.

By the present invention, improved additives for reducing cement slurry viscosities and improved methods of subterranean cementing using salt cement slurries are provided. The additives have effective dispersant properties for both fresh water and salt cement slurries and, unlike other dispersants, the dispersants of the present invention are effective in salt cement slurries at temperatures encountered in wellbore cementing where other dispersants are not effective.

The dispersants of the present invention are comprised of a water soluble copolymer or a mixture of such copolymers having two or more repeating monomer units, the copolymer having been formed by polymerization of the monomers. The repeating monomer units are not uniformly repeating; that is the distribution and correlation of the monomer units in a single polymer chain varies and the distribution of monomer units is generally random. However, this variation is dependent upon the polymerization conditions, the relative reactivities of the monomers, and the concentration of the monomers in the reaction. The copolymers of the present invention are comprised of in the range of 85 to 99 mole percent sodium vinylsulfonate and in the range of 1 to 15 mole percent of at least a selected one of the group consisting of acrylamide and acrylic acid. The molecular weight average of the copolymers are in the range of 10,000 to 100,000 and preferably in the range of about 10,000 to about 50,000. Stated another way, albeit in general terms, the polymers of this invention should have a molecular weight such that the Brookfield viscosity of a 10% aqueous solution of copolymer should not exceed 15 centipoise as measured on a RVT instrument with UL adapter at ambient temperature.

Preferred copolymers of sodium vinylsulfonate and acrylic acid comprise in the range of 90 1 to 99 mole percent sodium vinylsulfonate and in the range of 1 to 10 mole percent acrylic acid. The most preferred copolymers of sodium vinylsulfonate and acrylic acid comprise approximately 96.6 mole percent sodium vinylsulfonate and approximately 3.4 mole percent acrylic acid.

Although not more preferred than the binary copolymers of sodium vinylsulfonate and acrylic acid, some ternary copolymers of sodium vinylsulfonate, acrylic acid and a selected one of methacrylamide, methacrylic acid and acrylamide are effective dispersants in accordance with the present invention. Preferred ternary copolymers comprise in the range of 90 to 98 mole percent sodium vinylsulfonate, in the range of 1 to 9 mole percent acrylic acid, and in the range of 1 to 9 mole percent of a selected one of the group consisting of methacrylic acid, methacrylamide, and acrylamide.

Preferred copolymers of sodium vinylsulfonate and acrylamide comprise in the range of 90 to 99 mole percent sodium vinylsulfonate and 1 to 10 mole percent acrylamide. The most preferred copolymers of sodium vinylsulfonate and acrylamide comprise approximately 93.2 mole percent sodium vinylsulfonate and approximately 6.8 mole percent acrylamide.

Although not more preferred than the binary copolymers of sodium vinylsulfonate and acrylamide, some ternary copolymers of sodium vinylsulfonate, acrylamide and a selected one of methacrylamide, methacrylic acid and acrylic acid are effective dispersants in accordance with the present invention. Preferred ternary copolymers comprise in the range of 90 to 98 mole percent sodium vinylsulfonate, in the range of 1 to 9 mole percent acrylamide, and in the range of 1 to 9 mole percent of a selected one of the group consisting of methacrylic acid, methacrylamide, and acrylic acid.

The copolymers of this invention are synthesized by solution polymerization techniques employing catalysts such as sodium persulfate-sodium sulfite. No external chain transfer agent is required other than those present in the catalysts/initiators.

The low molecular weights desired are achieved by the use of a high concentration of the initiator. A high concentration of initiator-catalyst also improves yields and approximately 100 percent conversion is obtained. Accordingly, the resulting copolymers contain proportions of monomer units in the same relative amounts as the monomers in the reaction mixture.

Monomer reactivities and monomer sequence can be adjusted to some extent by pH adjustment of the reaction mixture. However, optimization of dispersant properties on the basis of pH adjustment is not known.

A reduced viscosity cement slurry for use in cementing wellbores penetrating subterranean formations in accordance with the present invention comprises a mixture of water, cement and the dispersant additive copolymers described herein. The present invention is especially suited for salt cement slurries containing an inorganic salt dissolved in the water in an amount from about 5 percent by weight of the water to a saturated amount (approximately 37.2 percent by weight of the water). The inorganic salts are preferably selected from the group consisting of sodium chloride and potassium chloride. The use of the dispersant of the present invention compared to prior art dispersants is preferred in salt cements having greater than 18 percent salt by weight of water and most preferred in saturated salt cements.

A salt cement slurry containing the dispersant of the present invention is prepared by dry blending the dispersant with cement and salt, typically sodium chloride. Other additives such as retarders and fluid loss additives can also be dry blended with the dispersant, cement and salt. A lignosulfate retarder and/or treated cellulose as a fluid loss additive, for example, can be added without deleterious effect to the dispersant properties of the copolymers. Generally, to achieve a desired dispersing effect, the dispersant copolymer of the present invention is added to the cement in an amount in the range of 0.1 to 3.0 percent by weight of the cement with the most preferred amount being in the range of 0.25 percent to 1.0 percent. A suitable amount of water is then mixed with the dry blend and the resulting salt cement slurry is pumped into the subterranean wellbore through the casing.

Preferably, in the cementing of subterranean formations in a wellbore, using the dispersants of the present invention, the formation has a temperature capable of producing or maintaining a temperature in the cement slurry greater than about 100° F. This prevents the cement slurry from being overly retarded which might otherwise occur at lower temperatures. This cement slurry static temperature attained in the wellbore and below which the cement slurry will be undesirably retarded, is referred to herein as the minimum static temperature. Thus, the desired minimum static temperatures of the cementing methods of the present invention should be in excess of 100° F.

As an alternative to dry blending of the dispersant copolymers of the present invention, a solution can be prepared to use as a liquid additive. A 40 percent active solution would be suitable for this purpose. This liquid additive is mixed with the water which is then utilized with an amount of cement suitable for wellbore cementing. This copolymer solution is desirable for wellbore cementing at locations where dry blending is difficult or impossible to achieve.

In order to facilitate a better understanding of the present invention, the following examples are given.

EXAMPLE 1

Copolymers, some in accordance with the present invention, are synthesized by solution polymerization techniques set forth below. The following abbreviations are used hereinafter:

1. acrylic acid: AA
2. acrylamide: AM
3. sodium vinylsulfonate: SVS
4. tetraethylenepentamine: TEPA
5. sodium persulfate: SP
6. sodium sulfite: SS
7. N, N, dimethyacrylamide: NNDMA
8. methacrylic acid: MAA
9. methacrylamide: MAM Referring to Tables I and II and each sample specified therein, the given quantities of monomers for each sample are dissolved in deionized water in a polymerization kettle fitted with a stirrer, an inlet tube and an outlet for nitrogen. The kettle and solution are maintained by a thermostat at 45° C. The kettle is flushed 30 minutes with nitrogen and the specified quantity of catalyst is added. Sodium persulfate is always added first, followed by sodium sulfite. A second increment of the same quantity of catalyst, if a second addition of catalyst is indicated, is added at the indicated time. Polymerization is allowed to proceed at 45° C. in a nitrogen atmosphere with stirring until polymerization is complete. Generally, polymerization is complete after 24 hours. Stirring is discontinued if the solution becomes highly viscous. After the reaction, the polymer from the aqueous solution is either isolated or precipatated in a nonsolvent (methanol or acetone) or sampled as an aqueous solution. The conversion of the monomers to polymers is essentially 100 percent. If pH is adjusted, it is adjusted by the addition of drops of sodium hydroxide or hydrochloric acid solution prior to addition of the catalyst. The quantities of SVS, if the solution concentration is not specified, are for a 25 percent aqueous solution. The remaining solutions are concentrated solutions.

TABLE I

| Sample Name | Reaction Mixture | Catalyst (Grams) SP | SS | Solution pH |
|---|---|---|---|---|
| A1 | 200 ml of 12.5% SVS | 1 | 1 | 6.5 |
| A2 | 200 ml of 12.5% SVS | 1.5 | 1.5 | 6.5 |
| A3 | 200 ml of 12.5% SVS | 1.5 | 1.5 | 8.0 |
| A4 | 200 ml of 12.5% SVS | 2.0 | — | 10.0 |
| A5 | 200 ml of 12.5% SVS | .5 | .5 | 8.0 |
| A6 | 200 ml of 12.5% SVS | .5 | .5 | 10.0 |
| A7 | 200 ml of 12.5% SVS | .3 | .3 | 8.0 |
| A8 | 200 ml of 12.5% SVS | .3 | .3 | 10.0 |

TABLE II

| Sample Name | Reaction Mixture | Catalyst (Grams) SP | SS | Solution Volume |
|---|---|---|---|---|
| C1 | SVS(200 ml) + AM(2 g) | 2 | 2 | 400 ml |
| C2 | SVS(200 ml) + AM(6 g) | 2 | 2 | 400 ml |
| C3 | SVS(600 ml) + AM(5 g) | 6 | 6 | 1.2 L |
| C4 | SVS(600 ml) + AM(7 g) | 6 | 6 | 1.2 L |
| C5 | SVS(600 ml) + AM(30 g) | 6 | 6 | 1.2 L |
| C6 | SVS(600 ml) + AA(18 ml) | 6 | 6 | 1.2 L |
| C7 | SVS(600 ml) + AA(10 ml) + AM(8 g) | 8 | 8 | 1.2 L |
| C8 | SVS(600 ml) + AA(25 ml) + AM(25 g) | 8 | 8 | 1.2 L |
| C9 | SVS(600 ml) + AM(6 g) | 6 | 0 | 600 ml |
| C10 | SVS(600 ml) + AM(6 g) | 3 | 1 | 600 ml |
| C11 | SVS(600 ml) + AM(6 g) | 6 | 3 | 600 ml (pH = 8) |
| C12 | SVS(1.2 L) + AM(12 g) | 8 | 0 | 1.2 L |
| C13 | SVS(1.2 L) + AM(12 g) | 10 | 10 | 1.2 L |
| C14 | SVS(1.2 L) + AM(12 g) | 8 | 8 | 1.2 L |
| C15 | SVS(1.2 L) + AM(10 g) + NNDMA(2 ml) | 8 | 8 | 1.2 L |
| C16 | SVS(1.2 L) + NNDMA(4 ml) | 8 | 8 | 1.2 L |
| C17 | SVS(1.2 L) + AM(10 g) + MAA(2 ml) | 8 | 8 | 1.2 L |
| C18 | SVS(1.2 L) + AM(8 g) + MAA(4 ml) | 8 | 8 | 1.2 L |
| C19 | SVS(1.2 L) + AM(8 g) + MAM(2 ml) + NNDMA(2 ml) | 8 | 8 | 1.2 L |
| C20 | SVS(1.2 L) + AM(8 g) + AA(2 ml) + MAA(2 ml) | 8 | 8 | 1.2 L |
| C21 | SVS(1.2 L) + AM(8 g) + AA(2 ml) + NNDMA(2 ml) | 8 | 8 | 1.2 L |
| C22 | SVS(1.2 L) + AM(8 g) + AA(10 ml) | 8 | 8 | 1.2 L |
| C23 | SVS(1.2 l) + AM(25 g) + AA(25 ml) | 8 | 8 | 1.2 L |
| C24 | SVS(1.2 L) + AA(12 ml) | 8 | 8 | 1.2 L |
| C25 | SVS(1.2 L) + MAA(12 ml) | 8 | 8 | 1.2 L |
| C26 | SVS(1.2 L) + AA(6 ml) + MAA(6 ml) | 8 | 8 | 1.2 L |
| C27 | SVS(1.2 L) + AA(15 ml) | 8 | 8 | 1.2 L |
| C28 | SVS(1.2 L) + AA(25 ml) | 8 | 8 | 102 L |
| C29 | SVS(1.2 L) + AA(6 ml) | 8 | 8 | 1.2 L |
| C30 | SVS(1.2 L) | 8 | 8 | 1.2 L |
| C31 | SVS(1.2 L) + AA(8 ml) | 8 | 8 | 1.2 L |
| C32 | SVS(1.2 L) + AA(10 ml) | 8 | 8 | 1.2 L |
| C33 | SVS(1.2 L) + AA(7 ml) | 8 | 8 | 1.2 |

EXAMPLE II

Each of the copolymer samples A1 through A8, prepared as described in Example I, is added to a cement slurry which is tested for its rheological properties and compressive strength. The tests indicate that cement slurries with these additives (low molecular weight polymers of vinylsulfonic acid) are not suitable as dispersants due to gelation of the salt slurries.

EXAMPLE III

Each of the samples C1 through C28, prepared as described in Example I, is used as an additive in a cement slurry. Each cement slurry is subjected to rheological and/or compressive strength testing. Salt cement slurry and fresh water cement slurries are tested. Tests are also conducted using a standard dispersant additive, naphtalene-sulfonic acid condensate (abbreviated hereinafter as NSA). The compressive strength tests are performed in accordance with Section 7 of *API Specification for Materials and Testing for Well Cement*, first edition (1982), published by the American Petroleum Institute, Washington, D.C. The rheology tests are conducted in accordance with Appendix H of the same API Specification publication. The pertinent portions of this reference are hereby incorporated by reference.

In some cases a turbulence rate in barrels per minute is calculated according to standard formulas using the Fann VG Meter data. The turbulence rate is the calculated minimum pumping rate for a Reynold's Number of 3000 between a $7\frac{5}{8}$ inch pipe and a $9\frac{5}{8}$ inch hole. Each slurry is prepared by dry mixing the additives, if any, with Class H cement. Water is added in the range of 4.3 to 4.9 gallons per sack of cement.

Calculated mole percentages of the polymers in Table II are set forth in Table III. The results of these tests are set forth in Tables IV through XVIII.

TABLE III

| Polymer | Composition of Polymers (All Percentages are Mole Percent) Composition |
|---|---|
| C1 | 93.2% SVS, 6.8% AM |
| C2 | 82.1% SVS, 17.9% AM |
| C3 | 94.2% SVS, 5.8% AM |
| C4 | 92.1% SVS, 7.9% AM |
| C5 | 73% SVS, 27% AM |
| C6 | 82% SVS, 18% AA |
| C7 | 83% SVS, 9% AA, 8% AM |
| C8 | 62.1% SVS, 18.8% AA, 19.1% AM |
| C9 | Same as C1 with molecular weight variation |
| C10 | Same as C1 with molecular weight variation |
| C11 | Same as C1 but polymerized at pH 8 |
| C12 | Same as C1 with molecular weight variation |
| C13 | Same as C1 with molecular weight variation |
| C14 | Same as C1 with molecular weight variation |
| C15 | 94% SVS, 5.2% AM, 0.8% NNDMA |
| C16 | 94.3% SVS, 4.2% AM, 1.5% NNDMA |
| C17 | 94% SVS, 5.2% AM, 0.8% MAA |
| C18 | 94.3% SVS, 4.2% AM, 1.5% MAA |
| C19 | 93% SVS, 5% AM, 1% NNDMA, 1% MAM |
| C20 | 93% SVS, 5% AM, 1% AA, 1% MAA |
| C21 | 93% SVS, 5% AM, 1% AA, 1% NNDMA |
| C22 | 91% SVS, 5% AA, 4% AM |

TABLE III-continued

Composition of Polymers
(All Percentages are Mole Percent)

| Polymer | Composition |
|---|---|
| C23 | 78% SVS, 11% AA, 11% AM |
| C24 | 94% SVS, 6% AA |
| C25 | 95% SVS, 5% MAA |
| C26 | 94% SVS, 3% AA, 3% MAA |
| C27 | 90% SVS, 10% AA |
| C28 | 71% SVS, 29% AA |
| C29 | 96.6% SVS, 3.4% AA |
| C30 | 100% SVS |
| C31 | 95.8% SVS, 4.2% AA |
| C32 | 95% SVS, 5% AA |
| C33 | 96.2% SVS, 3.8% AA |

TABLE IV

Effect of Increasing Temperature on
Rheology of Fresh Water Slurries
Class H Cement, 4.3 gal. water/sk,
(Slurry density - 16.4 lb/gal)

| Additive | Percent Addition (by wt of cmt) | Temp (°F.) | Atmospheric Consistometer (Bc) | | Rheological Properties Fann VG Meter | | | | Turbulence Rate* (BPM) |
|---|---|---|---|---|---|---|---|---|---|
| | | | Initial | 20 min. | 600 | 300 | 200 | 100 | |
| none | 0 | 100 | 7 | 10 | 200 | 147 | 116 | 89 | 25.9 |
| NSA | 1.0 | 100 | 3 | 7 | 75 | 26 | 13 | 6 | 1.9 |
| Cl | 1.0 | 100 | 4 | 11 | 95 | 39 | 22 | 9 | 4.1 |
| C29 | 1.0 | 100 | 4 | 8 | 83 | 29 | 17 | 7 | 2.8 |
| none | 0 | 140 | 6 | 11 | 193 | 122 | 100 | 82 | 24.1 |
| NSA | 1.0 | 140 | 3 | 7 | 55 | 21 | 10 | 4 | 0.8 |
| Cl | 1.0 | 140 | 5 | 11 | 83 | 28 | 15 | 6 | 1.6 |
| C29 | 1.0 | 140 | 3 | 9 | 95 | 38 | 24 | 9 | 3.8 |
| none | 0 | 190 | 6 | 15 | 240 | 215 | 152 | 112 | 30.5 |
| NSA | 1.0 | 190 | 6 | 14 | 59 | 21 | 11 | 5 | 1.5 |
| Cl | 1.0 | 190 | 4 | 8 | 123 | 86 | 70 | 54 | 18.6 |
| C29 | 1.0 | 190 | 5 | 7 | 92 | 42 | 28 | 16 | 8.4 |

*Minimum pumping rate required for Reynold's Number of 3000 between 7⅜" pipe and 9⅝" hole.

TABLE V

Effect of Increasing Temperature on
Rheology of 18% Salt Slurries
Class H Cement, 4.6 gal. water/sk,
(Slurry density - 16.4 lb/gal)

| Additive | Percent Addition (by wt of cmt) | Temp (°F.) | Atmospheric Consistometer (Bc) | | Rheological Properties Fann VG Meter | | | | Turbulence Rate* (BPM) |
|---|---|---|---|---|---|---|---|---|---|
| | | | Initial | 20 min. | 600 | 300 | 200 | 100 | |
| none | 0 | 100 | 5 | 9 | 107 | 70 | 59 | 45 | 16.5 |
| NSA | 1.0 | 100 | 4 | 8 | 65 | 23 | 14 | 6 | 2.5 |
| Cl | 1.0 | 100 | 4 | 6 | 85 | 40 | 29 | 18 | 9.1 |
| C29 | 1.0 | 100 | 4 | 7 | 79 | 35 | 25 | 15 | 6.4 |
| none | 0 | 140 | 5 | 9 | 103 | 74 | 63 | 51 | 17.2 |
| NSA | 1.0 | 140 | 4 | 5 | 64 | 27 | 19 | 12 | 6.7 |
| Cl | 1.0 | 140 | 3 | 6 | 89 | 65 | 45 | 36 | 14.4 |
| C29 | 1.0 | 140 | 4 | 7 | 83 | 54 | 42 | 29 | 13.3 |
| none | 0 | 190 | 6 | 8 | 84 | 58 | 45 | 130 | 13.9 |
| NSA | 1.0 | 190 | 5 | 11 | 150 | 103 | 93 | 83 | 21.8 |
| Cl | 1.0 | 190 | 4 | 5 | 62 | 38 | 31 | 21 | 10.4 |
| C29 | 1.0 | 190 | 4 | 6 | 30 | 30 | 25 | 16 | 8.4 |

*Minimum pumping rate required for Reynold's Number of 3000 between 7⅜" pipe and 9⅝" hole.

TABLE VI

Effect of Increasing Temperature on
Rheology of Saturated Salt Slurries
Class H Cement, 4.9 gal. water/sk,
(Slurry density - 16.4 lb/gal)

| Additive | Percent Addition (by wt of cmt) | Temp (°F.) | Atmospheric Consistometer (Bc) | | Rheological Properties Fann VG Meter | | | | Turbulence Rate* (BPM) |
|---|---|---|---|---|---|---|---|---|---|
| | | | Initial | 20 min. | 600 | 300 | 200 | 100 | |
| none | 0 | 100 | 5 | 7 | 79 | 43 | 35 | 25 | 12.1 |
| NSA | 1.0 | 100 | 4 | 9 | 112 | 79 | 67 | 51 | 17.7 |
| Cl | 1.0 | 100 | 4 | 7 | 90 | 57 | 45 | 31 | 13.6 |
| C29 | 1.0 | 100 | 4 | 7 | 64 | 32 | 24 | 15 | 7.0 |
| none | 0 | 140 | 5 | 8 | 65 | 42 | 36 | 26 | 11.7 |
| NSA | 1.0 | 140 | 5 | 9 | 92 | 64 | 55 | 45 | 15.9 |
| Cl | 1.0 | 140 | 3 | 5 | 54 | 25 | 18 | 12 | 8.1 |
| C29 | 1.0 | 140 | 4 | 6 | 46 | 20 | 12 | 7 | 3.7 |
| none | 0 | 190 | 5 | 6 | 57 | 32 | 25 | 17 | 7.8 |

TABLE VI-continued

Effect of Increasing Temperature on
Rheology of Saturated Salt Slurries
Class H Cement, 4.9 gal. water/sk,
(Slurry density - 16.4 lb/gal)

| Additive | Percent Addition (by wt of cmt) | Temp (°F.) | Atmospheric Consistometer (Bc) | | Rheological Properties Fann VG Meter | | | | Turbulence Rate* (BPM) |
|---|---|---|---|---|---|---|---|---|---|
| | | | Initial | 20 min. | 600 | 300 | 200 | 100 | |
| NSA | 1.0 | 190 | 3 | 11 | 128 | 90 | 84 | 80 | 20.3 |
| Cl | 1.0 | 190 | 4 | 5 | 46 | 21 | 15 | 10 | 4.7 |
| C29 | 1.0 | 190 | 4 | 6 | 37 | 15 | 9 | 5 | 3.3 |

*Minimum pumping rate required for Reynold's Number 3000 between 7⅝" pipe and 9⅝" hole.

TABLE VII

Effect of Increasing Temperature on
Rheology of 18% Salt Slurries
Class H Cement, 4.3 gal. water/sk,
(Slurry density - 16.7 lb/gal)

| Additive | Percent Addition (by wt of cmt) | Temp (°F.) | Atmospheric Consistometer (Bc) | | Rheological Properties Fann VG Meter | | | | Turbulence Rate* (BPM) |
|---|---|---|---|---|---|---|---|---|---|
| | | | Initial | 20 min. | 600 | 300 | 200 | 100 | |
| none | 0 | 100 | 6 | 10 | 138 | 97 | 80 | 63 | 19.9 |
| NSA | 1.0 | 100 | 3 | 6 | 81 | 35 | 22 | 10 | 6.5 |
| Cl | 1.0 | 100 | 3 | 6 | 111 | 62 | 48 | 33 | 14.1 |
| C29 | 1.0 | 100 | 4 | 7 | 112 | 60 | 46 | 29 | 13.2 |
| none | 0 | 140 | 5 | 8 | 116 | 83 | 70 | 55 | 18.1 |
| NSA | 1.0 | 140 | 2 | 4 | 51 | 20 | 12 | 6 | 2.0 |
| Cl | 1.0 | 140 | 2 | 5 | 99 | 62 | 49 | 35 | 14.4 |
| C29 | 1.0 | 140 | 3 | 7 | 107 | 69 | 53 | 37 | 15.4 |
| none | 0 | 190 | 11 | 25 | 225 | 135 | 92 | 66 | 24.4 |
| NSA | 1.0 | 190 | 3 | 85 | 300+ | 300+ | 300+ | 300+ | — |
| Cl | 1.0 | 190 | 4 | 7 | 95 | 62 | 48 | 36 | 14.5 |
| C29 | 1.0 | 190 | 2 | 5 | 88 | 54 | 44 | 32 | 13.4 |

*Minimum pumping rate required for Reynold's Number of 300 9⅝" hole.

TABLE VIII

Effect of Increasing Temperature on
Rheology of Saturated Salt Slurries
Class H Cement, 4.3 gal. water/sk,
(Slurry density - 16.9 lb/gal)

| Additive | Percent Addition (by wt of cmt) | Temp (°F.) | Atmospheric Consistometer (Bc) | | Rheological Properties Fann VG meter | | | | Turbulence Rate* (BPM) |
|---|---|---|---|---|---|---|---|---|---|
| | | | Initial | 20 min. | 600 | 300 | 200 | 100 | |
| none | 0 | 100 | 6 | 7 | 108 | 62 | 49 | 34 | 14.7 |
| NSA | 1.0 | 100 | 4 | 9 | 152 | 102 | 87 | 67 | 20.8 |
| Cl | 1.0 | 100 | 2 | 9 | 149 | 100 | 82 | 61 | 20.3 |
| C29 | 1.0 | 100 | 4 | 6 | 92 | 52 | 41 | 25 | 11.5 |
| none | 0 | 140 | 6 | 7 | 101 | 63 | 52 | 38 | 15.0 |
| NSA | 1.0 | 140 | 3 | 15 | 287 | 253 | 236 | 215 | 33.6 |
| Cl | 1.0 | 140 | 2 | 4 | 74 | 39 | 31 | 20 | 10.0 |
| C29 | 1.0 | 140 | 3 | 4 | 72 | 36 | 25 | 15 | 9.5 |
| none | 0 | 190 | 7 | 8 | 96 | 55 | 40 | 29 | 12.8 |
| NSA | 1.0 | 190 | 6 | 40 | 300+ | 300+ | 300+ | 300+ | — |
| Cl | 1.0 | 190 | 1 | 4 | 69 | 33 | 25 | 16 | 6.9 |
| C29 | 1.0 | 190 | 2 | 4 | 60 | 25 | 16 | 10 | 9.5 |

* Minimum pumping rate required for Reynold's Number 3000 between 7⅝" pipe and 9⅝" hole.

TABLE IX

Effect of C29 on Compressive Strength
Class H Cement, 4.3 gal water/sk

| Addition Level of C29 (% by wt of cmt) | NaCl (% by wt of water) | Temp (°F.) | 24 Hour Compressive Strength at 3000 psi (psi) |
|---|---|---|---|
| 0 | 0 | 140 | 5080 |
| 0.5 | 0 | 140 | 1640 |
| 1.0 | 0 | 140 | 50 |
| 0 | 18 | 140 | 3850 |
| 0.5 | 18 | 140 | no set |
| 1.0 | 18 | 140 | no set |
| 0 | 37.2 | 140 | 1660 |
| 0.5 | 37.2 | 140 | 1850 |
| 0.6 | 37.2 | 140 | 1710 |
| 0.7 | 37.2 | 140 | 1830 |
| 0.8 | 37.2 | 140 | 1650 |
| 0.9 | 37.2 | 140 | 1740 |
| 0 | 18 | 180 | 5720 |

TABLE IX-continued

Effect of C29 on Compressive Strength

Class H Cement, 4.3 gal water/sk

| Addition Level of C29 (% by wt of cmt) | NaCl (% by wt of water) | Temp (°F.) | 24 Hour Compressive Strength at 3000 psi (psi) |
|---|---|---|---|
| 1.0 | 18 | 180 | 3570 |

TABLE X

Rheology of C1 Series Polymers at 100° F.
Class H Cement, 4.3 gal. water/sk

| Additive | Percent Addition (by wt of cmt) | NaCl (% by wt of water) | Atmospheric Consistometer (Bc) Initial | 20 min. | Fann VG Meter 600 | 300 | 200 | 100 |
|---|---|---|---|---|---|---|---|---|
| none | 0 | 0 | 5 | 9 | 179 | 142 | 115 | 88 |
| C1 | 0.75 | 0 | 2 | 8 | 98 | 36 | 21 | 9 |
| C13 | 0.75 | 0 | 2 | 9 | 100 | 39 | 22 | 9 |
| C14 | 0.75 | 0 | 2 | 6 | 89 | 35 | 20 | 8 |
| C10 | 0.75 | 0 | 1 | 5 | 90 | 31 | 17 | 7 |
| C12 | 0.75 | 0 | 2 | 5 | 93 | 33 | 19 | 7 |
| C9 | 0.75 | 0 | 1 | 5 | 90 | 33 | 19 | 8 |
| C11 | 0.75 | 0 | 3 | 8 | 92 | 35 | 20 | 8 |
| C1 | 1.0 | 0 | 2 | 6 | 77 | 30 | 17 | 8 |
| C13 | 1.0 | 0 | 2 | 8 | 95 | 37 | 22 | 9 |
| C14 | 1.0 | 0 | 1 | 5 | 93 | 35 | 20 | 9 |
| C10 | 1.0 | 0 | 2 | 5 | 78 | 29 | 17 | 7 |
| C12 | 1.0 | 0 | 1 | 5 | 79 | 32 | 19 | 8 |
| C9 | 1.0 | 0 | 2 | 8 | 87 | 32 | 19 | 8 |
| C11 | 1.0 | 0 | 2 | 8 | 79 | 29 | 17 | 8 |
| none | 0 | 18 | 5 | 8 | 126 | 93 | 79 | 61 |
| C1 | 1.0 | 18 | 2 | 5 | 118 | 66 | 52 | 34 |
| C13 | 1.0 | 18 | 3 | 6 | 112 | 63 | 50 | 34 |
| C14 | 1.0 | 18 | 2 | 5 | 114 | 67 | 52 | 35 |
| C10 | 1.0 | 18 | 2 | 5 | 110 | 61 | 48 | 32 |
| C12 | 1.0 | 18 | 2 | 4 | 117 | 66 | 51 | 33 |
| C9 | 1.0 | 18 | 3 | 6 | 116 | 67 | 52 | 35 |
| C11 | 1.0 | 18 | 3 | 7 | 110 | 62 | 50 | 32 |
| none | 0 | 37.2 | 4 | 7 | 117 | 76 | 62 | 46 |
| C1 | 1.0 | 37.2 | 2 | 9 | 149 | 100 | 82 | 61 |
| C13 | 1.0 | 37.2 | 3 | 9 | 152 | 103 | 83 | 62 |
| C14 | 1.0 | 37.2 | 2 | 7 | 142 | 99 | 82 | 61 |
| C10 | 1.0 | 37.2 | 3 | 9 | 158 | 103 | 80 | 58 |
| C12 | 1.0 | 37.2 | 2 | 7 | 152 | 100 | 79 | 58 |
| C9 | 1.0 | 37.2 | 2 | 6 | 143 | 96 | 75 | 54 |
| C11 | 1.0 | 37.2 | 2 | 7 | 145 | 98 | 78 | 58 |

TABLE XI

Rheology of C1 Series Polymers at 140° F.
Class H Cement, 4.3 gal. water/sk

| Additive | Percent Addition (by wt of cmt) | NaCl (% by wt of water) | Atmospheric Consistometer (Bc) Initial | 20 min. | Fann VG Meter 600 | 300 | 200 | 100 |
|---|---|---|---|---|---|---|---|---|
| none | 0 | 0 | 5 | 10 | 225 | 175 | 125 | 96 |
| C1 | 1.0 | 0 | 2 | 7 | 80 | 28 | 15 | 7 |
| C13 | 1.0 | 0 | 2 | 8 | 170 | 25 | 13 | 5 |
| C14 | 1.0 | 0 | 1 | 5 | 66 | 26 | 12 | 6 |
| C10 | 1.0 | 0 | 2 | 5 | 74 | 25 | 12 | 6 |
| C12 | 1.0 | 0 | 1 | 5 | 70 | 25 | 13 | 6 |
| C9 | 1.0 | 0 | 1 | 7 | 80 | 30 | 15 | 6 |
| C11 | 1.0 | 0 | 3 | 7 | 68 | 25 | 12 | 6 |
| none | 0 | 18 | 5 | 8 | 116 | 83 | 70 | 55 |
| C1 | 1.0 | 18 | 2 | 5 | 99 | 62 | 49 | 35 |
| C13 | 1.0 | 18 | 2 | 7 | 105 | 68 | 54 | 40 |
| C14 | 1.0 | 18 | 2 | 5 | 100 | 65 | 51 | 38 |
| C10 | 1.0 | 18 | 2 | 6 | 114 | 71 | 56 | 42 |
| C12 | 1.0 | 18 | 2 | 6 | 112 | 72 | 56 | 42 |
| C9 | 1.0 | 18 | 2 | 8 | 104 | 67 | 52 | 37 |
| C11 | 1.0 | 18 | 3 | 7 | 105 | 67 | 51 | 37 |
| none | 0 | 37.2 | 6 | 7 | 101 | 63 | 52 | 38 |
| C1 | 1.0 | 37.2 | 2 | 4 | 74 | 39 | 31 | 20 |
| C13 | 1.0 | 37.2 | 2 | 5 | 74 | 40 | 32 | 20 |
| C14 | 1.0 | 37.2 | 2 | 4 | 73 | 39 | 32 | 20 |
| C10 | 1.0 | 37.2 | 5 | 4 | 72 | 38 | 27 | 16 |
| C12 | 1.0 | 37.2 | 2 | 5 | 73 | 39 | 31 | 19 |
| C9 | 1.0 | 37.2 | 3 | 5 | 77 | 40 | 32 | 20 |
| C11 | 1.0 | 37.2 | 3 | 5 | 73 | 38 | 31 | 19 |

TABLE XII

Rheology of C1 Series Polymers at 190° F.
Class H Cement, 4.3 gal. water/sk

| Additive | Percent Addition (by wt of cmt) | NaCl (% by wt of water) | Atmospheric Consistometer (Bc) | | Fann VG Meter | | | |
|---|---|---|---|---|---|---|---|---|
| | | | Initial | 20 min. | 600 | 300 | 200 | 100 |
| none | 0 | 0 | 6 | 15 | 240 | 215 | 152 | 112 |
| C1 | 1.0 | 0 | 1 | 5 | 104 | 74 | 59 | 44 |
| C13 | 1.0 | 0 | 2 | 8 | 109 | 74 | 55 | 41 |
| C14 | 1.0 | 0 | 1 | 6 | 107 | 63 | 49 | 35 |
| C10 | 1.0 | 0 | 1 | 4 | 97 | 55 | 39 | 24 |
| C12 | 1.0 | 0 | 2 | 5 | 104 | 72 | 52 | 35 |
| C9 | 1.0 | 0 | 2 | 8 | 109 | 74 | 56 | 41 |
| C11 | 1.0 | 0 | 1 | 6 | 105 | 73 | 51 | 34 |
| none | 0 | 18 | 5 | 9 | 117 | 82 | 66 | 56 |
| C1 | 1.0 | 18 | 2 | 4 | 80 | 50 | 35 | 24 |
| C13 | 1.0 | 18 | 2 | 6 | 77 | 46 | 35 | 24 |
| C14 | 1.0 | 18 | 2 | 4 | 79 | 44 | 36 | 23 |
| C10 | 1.0 | 18 | 2 | 4 | 80 | 43 | 35 | 21 |
| C12 | 1.0 | 18 | 2 | 4 | 76 | 41 | 33 | 21 |
| C9 | 1.0 | 18 | 2 | 6 | 75 | 45 | 35 | 22 |
| C11 | 1.0 | 18 | 2 | 5 | 75 | 47 | 34 | 22 |
| none | 0 | 37.2 | 8 | 8 | 96 | 55 | 40 | 29 |
| C1 | 1.0 | 37.2 | 1 | 4 | 69 | 33 | 25 | 16 |
| C13 | 1.0 | 37.2 | 3 | 5 | 65 | 32 | 23 | 16 |
| C14 | 1.0 | 37.2 | 1 | 4 | 70 | 34 | 26 | 17 |
| C10 | 1.0 | 37.2 | 2 | 4 | 65 | 32 | 22 | 14 |
| C12 | 1.0 | 37.2 | 2 | 4 | 64 | 30 | 22 | 14 |
| C9 | 1.0 | 37.2 | 3 | 5 | 70 | 32 | 22 | 14 |
| C11 | 1.0 | 37.2 | 3 | 5 | 66 | 32 | 22 | 15 |

TABLE XIII

Effect of Varying AA/SVS Ratio on
Rheology of Fresh Water Slurries at 100° F.
Class H Cement, 4.3 gal/sk, 16.4 lb/gal

| Additive | Percent Addition (by wt of cmt) | Acrylic Acid Content of Additive (mole %) | Atmospheric Consistometer (Bc) | | Fann VG Meter | | | |
|---|---|---|---|---|---|---|---|---|
| | | | Initial | 20 min. | 600 | 300 | 200 | 100 |
| none | 0 | 0 | 5 | 8 | 182 | 137 | 108 | 83 |
| C33 | 0.50 | 3.8 | 4 | 8 | 102 | 40 | 26 | 15 |
| C33 | 0.75 | 3.8 | 2 | 7 | 95 | 35 | 21 | 9 |
| C33 | 1.0 | 3.8 | 2 | 6 | 92 | 36 | 22 | 9 |
| C31 | 0.50 | 4.2 | 4 | 9 | 100 | 40 | 27 | 13 |
| C31 | 0.75 | 4.2 | 2 | 7 | 90 | 35 | 21 | 9 |
| C32 | 0.50 | 5 | 3 | 9 | 98 | 37 | 23 | 10 |
| C32 | 1.0 | 5 | 3 | 6 | 83 | 32 | 19 | 8 |
| C24 | 0.75 | 6 | 3 | 8 | 71 | 30 | 17 | 7 |
| C27 | 0.75 | 10 | 3 | 6 | 69 | 28 | 16 | 7 |
| C6 | 0.75 | 18 | 2 | 6 | 70 | 26 | 15 | 6 |
| C28 | 0.75 | 29 | 3 | 8 | 73 | 29 | 17 | 7 |
| NSA | 1.0 | 0 | 3 | 7 | 73 | 26 | 13 | 6 |

TABLE XIV

Effect of Varying AA/SVS Ratio on
Rheology of 18% Salt Slurries at 100° F.
Class H Cement, 4.3 gal/sk 16.7 lb/gal

| Additive | Percent Addition (by wt of cmt) | Acrylic Acid Content of Additive (mole %) | Atmospheric Consistometer (Bc) | | Fann VG Meter | | | |
|---|---|---|---|---|---|---|---|---|
| | | | Initial | 20 min. | 600 | 300 | 200 | 100 |
| none | 0 | — | 5 | 10 | 134 | 90 | 73 | 56 |
| C29 | 1.0 | 3.4 | 4 | 6 | 100 | 49 | 35 | 21 |
| C33 | 0.5 | 3.8 | 2 | 5 | 101 | 55 | 46 | 30 |
| C33 | 0.75 | 3.8 | 2 | 5 | 96 | 50 | 40 | 25 |
| C33 | 1.0 | 3.8 | 4 | 6 | 93 | 48 | 36 | 22 |
| C31 | 0.75 | 4.2 | 2 | 5 | 98 | 48 | 34 | 20 |
| C31 | 1.0 | 4.2 | 4 | 7 | 99 | 50 | 35 | 20 |
| C32 | 0.5 | 5 | 3 | 5 | 99 | 50 | 36 | 22 |
| C32 | 0.75 | 5 | 3 | 6 | 96 | 45 | 33 | 19 |
| C32 | 1.0 | 5 | 3 | 7 | 103 | 51 | 35 | 20 |
| none* | 0 | — | 4 | 7 | 108 | 70 | 58 | 44 |
| C24 | 0.5 | 6 | 3 | 5 | 84 | 48 | 37 | 24 |
| C24 | 1.0 | 6 | 4 | 6 | 90 | 45 | 33 | 20 |
| C27 | 1.0 | 10 | 4 | 6 | 95 | 50 | 34 | 19 |

TABLE XIV-continued

Effect of Varying AA/SVS Ratio on
Rheology of 18% Salt Slurries at 100° F.
Class H Cement, 4.3 gal/sk 16.7 lb/gal

| Additive | Percent Addition (by wt of cmt) | Acrylic Acid Content of Additive (mole %) | Atmospheric Consistometer (Bc) | | Fann VG Meter | | | |
|---|---|---|---|---|---|---|---|---|
| | | | Initial | 20 min. | 600 | 300 | 200 | 100 |
| C6 | 1.0 | 18 | 3 | 8 | 86 | 44 | 30 | 15 |
| C28 | 1.0 | 29 | 1 | 4 | 82 | 40 | 26 | 13 |

*Additives C24, C27, C6 and C28 are tested using a different batch of Class H cement from that tested with additives C29, C31, C32 and C33.

TABLE XV

Effect of Varying AA/SVS Ratio on
Rheology of Saturated Salt Slurries at 100° F.
Class H Cement, 4.3 gal/sk, 16.9 lb/gal

| Additive | Percent Addition (by wt of cmt) | Acrylic Acid Content of Additive (mole %) | Atmospheric Consistometer (Bc) | | Fann VG Meter | | | |
|---|---|---|---|---|---|---|---|---|
| | | | Initial | 20 min. | 600 | 300 | 200 | 100 |
| none | 0 | — | 6 | 6 | 104 | 62 | 50 | 35 |
| C30 | 0.50 | 0 | 4 | 6 | 122 | 80 | 62 | 43 |
| C30 | 0.75 | 0 | 3 | 7 | 123 | 81 | 62 | 43 |
| C30 | 1.0 | 0 | 3 | 7 | 124 | 82 | 64 | 45 |
| C29 | 0.50 | 3.4 | 1 | 8 | 120 | 78 | 60 | 42 |
| C29 | 1.0 | 3.4 | 4 | 6 | 92 | 52 | 41 | 25 |
| C33 | 0.50 | 3.8 | 4 | 8 | 114 | 73 | 57 | 40 |
| C33 | 0.75 | 3.8 | 3 | 5 | 103 | 65 | 50 | 35 |
| C33 | 1.0 | 3.8 | 4 | 6 | 95 | 54 | 43 | 28 |
| C31 | 0.5 | 4.2 | 4 | 6 | 92 | 50 | 41 | 26 |
| C31 | 0.75 | 4.2 | 4 | 6 | 84 | 45 | 34 | 20 |
| C31 | 1.0 | 4.2 | 2 | 5 | 82 | 42 | 29 | 17 |
| C32 | 0.5 | 5.0 | 2 | 4 | 86 | 51 | 41 | 26 |
| C32 | 1.0 | 5.0 | 3 | 6 | 84 | 41 | 28 | 16 |
| C24 | 0.50 | 6.0 | 4 | 8 | 101 | 66 | 51 | 37 |
| C24 | 1.0 | 6.0 | 4 | 6 | 80 | 44 | 33 | 20 |
| C27 | 1.0 | 10 | 1 | 6 | 90 | 45 | 31 | 17 |
| C6 | 0.50 | 18 | 4 | 7 | 79 | 42 | 29 | 16 |
| C6 | 1.0 | 18 | 1 | 6 | 78 | 38 | 25 | 13 |
| C28 | 1.0 | 29 | 3 | 6 | 76 | 37 | 25 | 12 |

TABLE XVI

Effect of Varying AM/SVS
Ratio on Rheology at 100° F.
Class H Cement, 4.3 gal/sk

| Additive | Percent Addition (by wt of cmt) | AM (mole %) | NaCl (% by wt of water) | Atmospheric Consistometer (Bc) | | Fann VG Meter | | | |
|---|---|---|---|---|---|---|---|---|---|
| | | | | Initial | 20 min. | 600 | 300 | 200 | 100 |
| none | 0 | — | 0 | 5 | 7 | 165 | 135 | 108 | 84 |
| C3 | 1.0 | 5.8 | 0 | 1 | 5 | 85 | 34 | 22 | 10 |
| C4 | 1.0 | 7.9 | 0 | 1 | 5 | 100 | 43 | 30 | 17 |
| C2 | 1.0 | 18 | 0 | 2 | 5 | 100 | 40 | 26 | 13 |
| C5 | 1.0 | 27 | 0 | 3 | 5 | 103 | 46 | 31 | 18 |
| none | 0 | — | 18 | 5 | 8 | 133 | 91 | 80 | 62 |
| C3 | 1.0 | 5.8 | 18 | 3 | 5 | 110 | 61 | 42 | 31 |
| C4 | 1.0 | 7.9 | 18 | 2 | 6 | 116 | 63 | 51 | 34 |
| C2 | 1.0 | 18 | 18 | 2 | 4 | 120 | 66 | 51 | 35 |
| C5 | 1.0 | 27 | 18 | 2 | 5 | 126 | 73 | 59 | 40 |
| none | 0 | — | 37.2 | 3 | 5 | 113 | 71 | 59 | 42 |
| C3 | 1.0 | 5.8 | 37.2 | 2 | 5 | 117 | 75 | 61 | 43 |
| C4 | 1.0 | 7.9 | 37.2 | 1 | 7 | 152 | 100 | 86 | 66 |
| C2 | 1.0 | 18 | 37.2 | 2 | 9 | 174 | 120 | 100 | 75 |
| C5 | 1.0 | 27 | 37.2 | 2 | 10 | 175 | 126 | 105 | 80 |

TABLE XVII

Rheology of Slurries Containing
SVS/AA/AM Terpolymers
Class H Cement, 4.3 gal/sk

| Additive | Percent Addition (by wt of cmt) | NaCl (% by wt of water) | Temp (°F.) | Atmospheric Consistometer (Bc) Initial | 20 min. | Fann VG Meter 600 | 300 | 200 | 100 |
|---|---|---|---|---|---|---|---|---|---|
| none | 0 | 0 | 100 | 5 | 9 | 190 | 150 | 118 | 92 |
| C7 | 1.0 | 0 | 100 | 2 | 6 | 93 | 35 | 20 | 8 |
| none | 0 | 0 | 100 | 5 | 9 | 180 | 136 | 105 | 80 |
| C8 | 0.5 | 0 | 100 | 4 | 8 | 89 | 32 | 19 | 8 |
| C8 | 1.0 | 0 | 100 | 3 | 5 | 88 | 32 | 19 | 8 |
| none | 0 | 18 | 100 | 4 | 8 | 134 | 91 | 76 | 58 |
| C8 | 0.5 | 18 | 100 | 4 | 7 | 95 | 51 | 40 | 25 |
| C8 | 1.0 | 18 | 100 | 4 | 7 | 93 | 42 | 31 | 17 |
| C7 | 1.0 | 18 | 100 | 3 | 7 | 103 | 58 | 45 | 28 |
| C23 | 1.0 | 18 | 100 | 3 | 7 | 97 | 51 | 41 | 24 |
| none | 0 | 37.2 | 100 | 8 | 8 | 105 | 64 | 51 | 35 |
| C8 | 0.5 | 37.2 | 100 | 3 | 5 | 81 | 45 | 36 | 21 |
| C8 | 1.0 | 37.2 | 100 | 3 | 4 | 70 | 33 | 20 | 10 |
| C7 | 1.0 | 37.2 | 100 | 3 | 6 | 92 | 53 | 40 | 25 |
| C22 | 1.0 | 37.2 | 100 | 4 | 6 | 92 | 54 | 44 | 27 |
| C23 | 1.0 | 37.2 | 100 | 4 | 6 | 80 | 38 | 24 | 13 |
| none | 0 | 0 | 140 | 6 | 12 | 215 | 160 | 122 | 94 |
| C8 | 0.5 | 0 | 140 | 3 | 6 | 78 | 30 | 18 | 8 |
| C7 | 1.0 | 0 | 140 | 3 | 6 | 78 | 28 | 14 | 6 |
| none | 0 | 18 | 140 | 6 | 8 | 118 | 84 | 70 | 55 |
| C8 | 0.25 | 18 | 140 | 4 | 6 | 101 | 60 | 46 | 33 |
| C8 | 1.0 | 18 | 140 | 4 | 7 | 97 | 56 | 44 | 26 |
| C7 | 1.0 | 18 | 140 | 2 | 7 | 112 | 72 | 55 | 37 |
| none | 0 | 37.2 | 140 | 6 | 8 | 100 | 62 | 52 | 38 |
| C8 | 0.25 | 37.2 | 140 | 4 | 4 | 70 | 30 | 22 | 14 |
| C7 | 1.0 | 37.2 | 140 | 2 | 4 | 65 | 28 | 19 | 10 |
| none | 0 | 0 | 190 | 5 | 15 | 240 | 170 | 140 | 104 |
| C8 | 1.0 | 0 | 190 | 4 | 8 | 108 | 55 | 41 | 24 |
| none | 090 | 18 | 190 | 5 | 10 | 150 | 108 | 76 | 55 |
| C8 | 0.5 | 18 | 190 | 3 | 4 | 65 | 29 | 20 | 11 |
| none | 0 | 37.2 | 190 | 5 | 8 | 106 | 72 | 50 | 35 |
| C8 | 0.13 | 37.2 | 190 | 3 | 4 | 62 | 29 | 21 | 13 |
| C8 | 0.5 | 37.2 | 190 | 3 | 5 | 45 | 18 | 10 | 5 |

TABLE XVIII

100° F. Saturated Salt Rheology with Polymers
Consisting of Various Monomers
Class H Cement, 4.3 gal/sk, 16.9 lb/gal

| Additive | Percent Addition (by wt of cmt) | Atmospheric Consistometer (Bc) Initial | Final | Fann VG Meter 600 | 300 | 200 | 100 |
|---|---|---|---|---|---|---|---|
| None | 0 | 5 | 5 | 106 | 61 | 49 | 34 |
| C15 | 1.0 | 4 | 8 | 135 | 90 | 72 | 52 |
| C16 | 1.0 | 5 | 9 | 140 | 97 | 77 | 56 |
| C17 | 1.0 | 3 | 7 | 130 | 82 | 65 | 48 |
| C18 | 1.0 | 4 | 9 | 130 | 82 | 64 | 46 |
| C19 | 1.0 | 5 | 9 | 145 | 106 | 89 | 68 |
| C20 | 1.0 | 4 | 6 | 115 | 73 | 58 | 40 |
| C21 | 1.0 | 4 | 8 | 126 | 82 | 65 | 47 |
| C25 | 1.0 | 4 | 5 | 102 | 62 | 47 | 33 |
| C26 | 1.0 | 4 | 6 | 83 | 42 | 29 | 16 |

Referring to the data in the Tables IV through XVIII, copolymers of SVS and a selected one of acrylic acid and acrylamide have the best dispersant properties. The SVS/AA copolymers reduce viscosity at lower temperatures in a saturated salt slurry. Accordingly, this polymer has the broadest temperature range as an effective dispersant.

Referring to Tables IV, V, VI, VII and VIII the dispersant abilities of NSA, C1 and C29 are compared. Under the conditions tested NSA has superior friction reducing qualities in fresh water and 18% salt up to 140° F. C29 is a superior dispersant in saturated salt and 18% salt at 180° F. C29 reduces the viscosities of all the slurries tested whereas NSA gels several of the slurries to the point of being unpumpable.

Referring to Table IX, the effects of C29 on compressive strength at 140° F. are compared. In saturated salt, C29 does not alter compressive strength development. In fresh water, and particularly 18% salt, there is an effect. However, at 18% salt and 180° F. where NSA fails, C29 does not prevent adequate compressive strength development.

Referring to Tables X, XI and XII the effects of varying molecular weight on rheology are compared. Although molecular weights are not precisely determined, molecular weight increases in the order of C1, C13, C14, C10, C12, C9 and C11 with C11 being the highest. It is believed that C11 has a molecular weight average less than 50,000 and that C1 has a molecular weight average greater than 10,000. Within this range, no significant difference in performance is detected.

Tables XIII, XIV and XV illustrate the effect of increasing acrylic acid content on rheology. As acrylic acid content is increased, the polymer becomes a more powerful dispersant. It also becomes a more powerful retarder. From this data, it is indicated that SVS copolymers of acrylic acid or acrylamide in an amount greater than 15 mole percent act as too powerful of a retarder and would not be suitable for use as a dispersant. A dispersant having a broad temperature range and not acting as too powerful a retarder while still having superior dispersant properties are the C1 and C29 copolymers with the C29 having the broadest temperature range of application.

The data in Table XVI shows that increasing the acrylamide levels in the copolymers does not increase the dispersant properties at 100° F. in saturated salt slurries.

Tables XVII and XVIII show that some ternary copolymers (terpolymers) of SVS/AM/AA will also act as effective dispersants. This indicates that the relative amounts of acrylic acid and acrylamide in the copolymer or terpolymer are critical, and even minor variations produce significant changes in performance characteristics, especially with respect to compressive strength. This is further indicated by the observation that a copolymer of SVS/MAA is not an effective dispersant. Thus, although methacrylamide and methacrylic acid are closely related to acrylamide and acrylic acid, they are not useful in binary copolymers. They are suitable monomers in ternary copolymers with the proper ratio of acrylic acid and/or acrylamide. Further, although terpolymers C7 and C8 acted as good dispersants, they are stronger retarders and would require a minimum static temperature of about 200° F. to allow for adequate short term compressive strength development.

We claim:

1. In a method for cementing a subterranean wellbore wherein a salt cement slurry is pumped into the wellbore for cementing therein, the improvement which comprises including in said salt cement slurry an additive comprising:
   copolymers having a molecular weight average in the range of 10,000 to 100,000 and comprised of repeating monomer units in the range of 85 to 99 mole percent sodium vinylsulfonate and in the range of 1 to 15 mole percent of at least a selected one of the group consisting of acrylamide and acrylic acid.

2. The method of claim 1 wherein:
   said copolymers are present in said salt cement slurry in an amount in the range of about 0.1 to about 3.0 percent by weight of said cement.

3. The method of claim 2 wherein:
   said copolymers are present in said salt cement slurry in an amount in the range of about 0.25 to 1.0 percent by weight of said cement.

4. The method of claim 1 wherein said copolymers have a molecular weight average in the range of from about 10,000 to about 50,000.

5. The method of claim 1 wherein the minimum static temperature of the cement slurry in said wellbore is greater than 100° F.

6. The method of claim 1 wherein said copolymers are comprised of repeating monomer units in the range of 90 to 99 mole percent sodium vinyl sulfonate and in the range of 1 to 10 mole percent acrylic acid.

7. The method of claim 1 wherein said copolymers are comprised of repeating monomer units in the range of 90 to 98 mole percent sodium vinylsulfonate, in the range of 1 to 9 mole percent acrylic acid, and in the range of 1 to 9 mole percent of a selected one of the group consisting of methacrylic acid, methacrylamide, and acrylamide.

8. The method of claim 1 wherein said copolymers are comprised of approximately 96.6 mole percent sodium vinylsulfonate monomer units and approximately 3.4 mole percent acrylic acid monomer units.

9. The method of claim 1 wherein said copolymers are comprised of repeating monomer units in the range of 90 to 99 mole percent sodium vinylsulfonate and in the range of 1 to 10 mole percent acrylamide.

10. The method of claim 1 wherein said copolymers are comprised of repeating monomer units in the range of 90 to 98 mole percent sodium vinylsulfonate, in the range of 1 to 9 mole percent acrylamide, and in the range of 1 to 9 mole percent of a selected one of the group consisting of methacrylic acid, methacrylamide, and acrylic acid.

11. The method of claim 1 wherein said copolymers are comprised of approximately 93.2 mole percent sodium vinylsulfonate monomer units and approximately 6.8 mole percent acrylamide monomer units.

12. The method of claim 1 wherein the salt of said salt cement slurry comprises a salt selected from the group consisting of sodium chloride and potassium chloride and is present in said slurry in an amount from 5 to 37.2 percent by weight of water in said slurry.

13. An additive for reducing viscosity in cement slurries comprising:
   a water soluble copolymer or mixture of copolymers having a molecular weight average such that the Brookfield viscosity of a 10% aqueous solution of these polymers as measured on an RVT instrument with UL adapter does not exceed 15 centipoise at ambient temperature and comprised of repeating monomer units in the range of 85 to 99 mole percent sodium vinylsulfonate and in the range of 1 to 15 mole percent of at least a selected one of the group consisting of acrylamide and acrylic acid, the copolymers having been obtained by polymerization of the monomers.

14. The additive of claim 13 wherein said copolymers are comprised of repeating monomer units in the range of 90 to 99 mole percent sodium vinylsulfonate and in the range of 1 to 10 mole percent acrylic acid.

15. The additive of claim 13 wherein said copolymers are comprised of repeating monomer units in the range of 90 to 98 mole percent sodium vinylsulfonate, in the range of 1 to 9 mole percent acrylic acid, and in the range of 1 to 9 mole percent of a selected one of the group consisting of methacrylic acid, methacrylamide, and acrylamide.

16. The additive of claim 13 wherein said copolymers are comprised of approximately 96.6 mole percent sodium vinylsulfonate monomer units and approximately 3.4 mole percent acrylic acid monomer units.

17. The additive of claim 13 wherein said copolymers are comprised of repeating monomer units in the range of 90 to 99 mole percent sodium vinylsulfonate and in the range of 1 to 10 mole percent acrylamide.

18. The additive of claim 13 wherein said copolymers are comprised of repeating monomer units in the range of 90 to 98 mole percent sodium vinylsulfonate, in the range of 1 to 9 mole percent acrylamide, and in the range of 1 to 9 mole percent of a selected one of the group consisting of methacrylic acid, methacrylamide, and acrylic acid.

19. The additive of claim 13 wherein said copolymers are comprised of approximately 93.2 mole percent sodium vinylsulfonate monomer units and approximately 6.8 mole percent acrylamide monomer units.

20. A reduced viscosity salt cement slurry for cementing wellbores penetrating subterranean formations comprising:
   water;
   an inorganic salt dissolved in said water in the range of from 5 percent by weight of said water to a saturated amount;

an additive for reducing the viscosity of said salt cement slurry comprised of a copolymer or mixture of copolymers having a molecular weight average in the range of 10,000 to 100,000 and comprised of repeating monomer units in the range of 85 to 99 mole percent sodium vinylsulfonate and in the range of 1 to 15 mole percent of at least a selected one of the group consisting of acrylamide and acrylic acid, the copolymers having been obtained by polymerization of the monomers; and cement mixed with said water, salt and additive in an amount such that said cement slurry is suitable for cementing wellbores penetrating subterranean well formations.

21. The cement slurry of claim 20 wherein said inorganic salt is selected from the group consisting of sodium chloride and potassium chloride.

22. The cement slurry of claim 20 wherein said copolymers have a molecular weight average in the range of from about 10,000 to about 50,000.

23. The cement slurry of claim 20 wherein said copolymers are comprised of repeating monomer units in the range of 90 to 99 mole percent sodium vinylsulfonate and in the range of 1 to 10 mole percent acrylic acid.

24. The cement slurry of claim 20 wherein said copolymers are comprised of repeating monomer units in the range of 90 to 98 mole percent sodium vinylsulfonate, in the range of 1 to 9 mole percent acrylic acid, and in the range of 1 to 9 mole percent of a selected one of the group consisting of methacrylic acid, methacrylamide, and acrylamide.

25. The cement slurry of claim 20 wherein said copolymers are comprised of approximately 96.6 mole percent sodium vinylsulfonate monomer units and approximately 3.4 mole percent acrylic acid monomer units.

26. The cement slurry of claim 20 wherein said copolymers are comprised of repeating monomer units in the range of 90 to 99 mole percent sodium vinylsulfonate and in the range of 1 to 10 mole percent acrylamide.

27. The cement slurry of claim 20 wherein said copolymers are comprised of repeating monomer units in the range of 90 to 98 mole percent sodium vinylsulfonate, in the range of 1 to 9 mole percent acrylamide, and in the range of 1 to 9 mole percent of a selected one of the group consisting of methacrylic acid, methacrylamide, and acrylic acid.

28. The cement slurry of claim 20 wherein said copolymers are comprised of approximately 93.2 mole percent sodium vinylsulfonate monomer units and approximately 6.8 mole percent acrylamide monomer units.

* * * * *